United States Patent [19]

Ledvina

[11] Patent Number: 4,758,209
[45] Date of Patent: Jul. 19, 1988

[54] SILENT TIMING CHAIN AND SPROCKET SYSTEM

[75] Inventor: Timothy J. Ledvina, Ithaca, N.Y.

[73] Assignee: Borg-Warner Automotive, Inc., Troy, Mich.

[21] Appl. No.: 32,816

[22] Filed: Apr. 1, 1987

[51] Int. Cl.⁴ .......................... F16H 7/06; F16G 13/06
[52] U.S. Cl. ....................................... 474/156; 474/212
[58] Field of Search .................... 474/212–217, 474/152, 153, 155–157; 59/84

[56] References Cited

U.S. PATENT DOCUMENTS

| Re. 12,912 | 1/1909 | Morse | 474/212 X |
|---|---|---|---|
| Re. 22,488 | 5/1944 | Focke | 474/231 |
| 586,991 | 7/1897 | Curley | 474/156 |
| 588,950 | 8/1897 | Brown | 474/155 |
| 592,552 | 10/1897 | Morse | 474/212 X |
| 1,115,960 | 11/1914 | Morse | 474/217 |
| 1,447,644 | 3/1923 | Chapman | 474/157 |
| 1,860,514 | 5/1932 | Stiansen | 474/213 |
| 2,056,602 | 10/1936 | Dull et al. | 474/213 X |
| 2,653,485 | 9/1953 | MacArthur | 474/215 |
| 3,298,406 | 1/1967 | Erickson | 143/32 |
| 3,495,468 | 2/1970 | Griffel | 474/157 |
| 4,168,634 | 9/1979 | Griffel | 474/157 |
| 4,174,642 | 11/1979 | Martin et al. | 474/156 |

Primary Examiner—Thuy M. Bui
Attorney, Agent, or Firm—James A. Geppert

[57] ABSTRACT

A sprocket for use with a silent timing chain for automotive vehicle or industrial drive applications wherein the sprocket is formed with an even number of teeth of which there are alternating tooth profiles. One tooth profile comprises outwardly converging straight-sided flanks and the other profile comprises involute curved flanks. This sprocket is used with a block-type timing chain so that the straight-sided flanks engage the inside flanks of the leading chain link teeth and the involute curved flanks engage the outside flanks of the trailing link teeth.

9 Claims, 3 Drawing Sheets

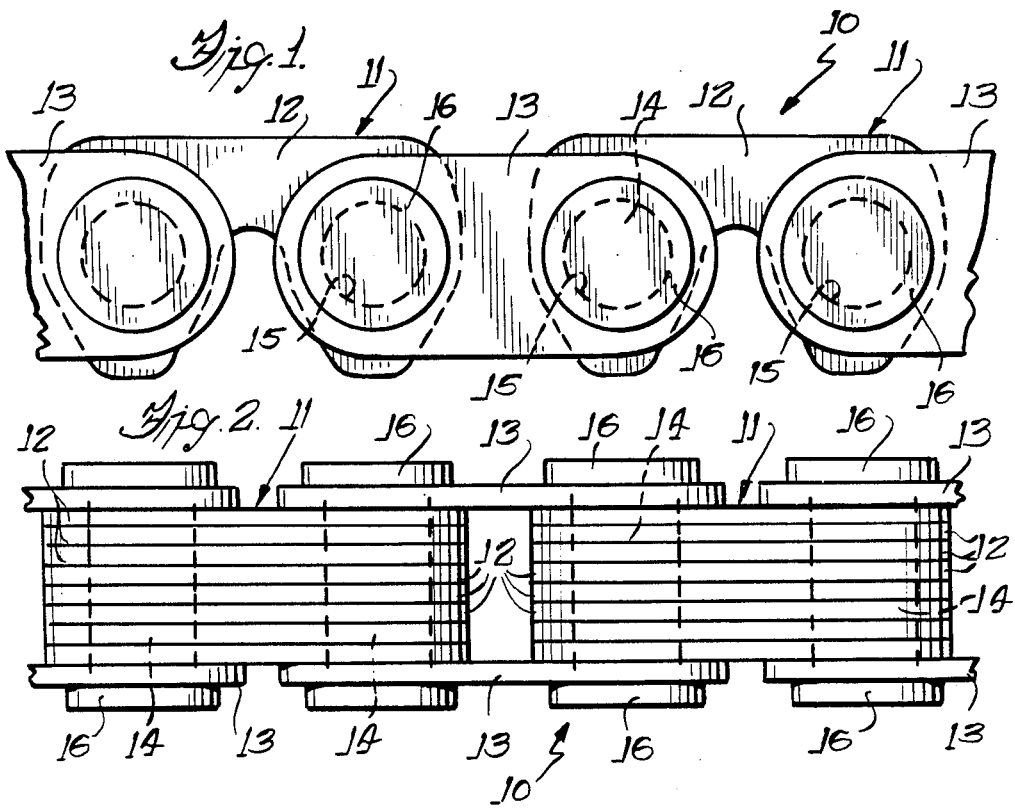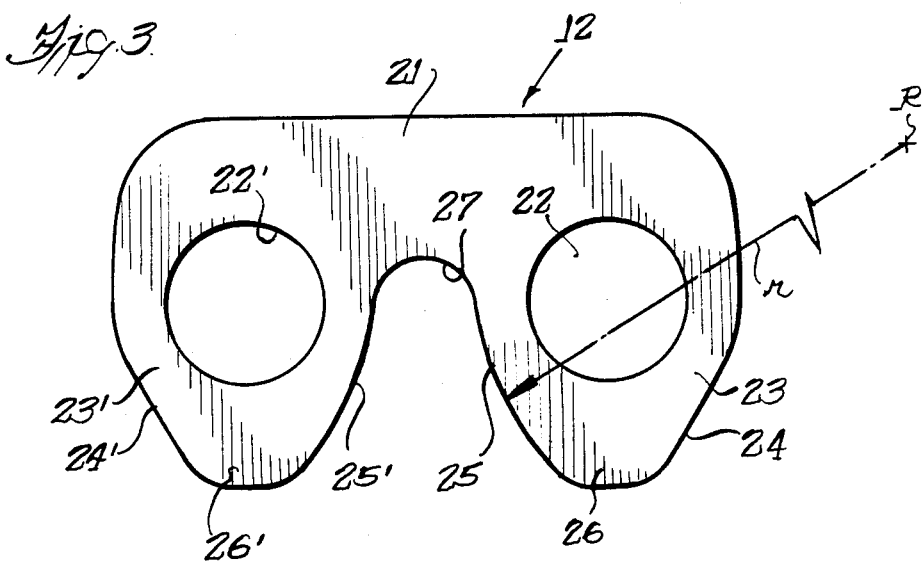

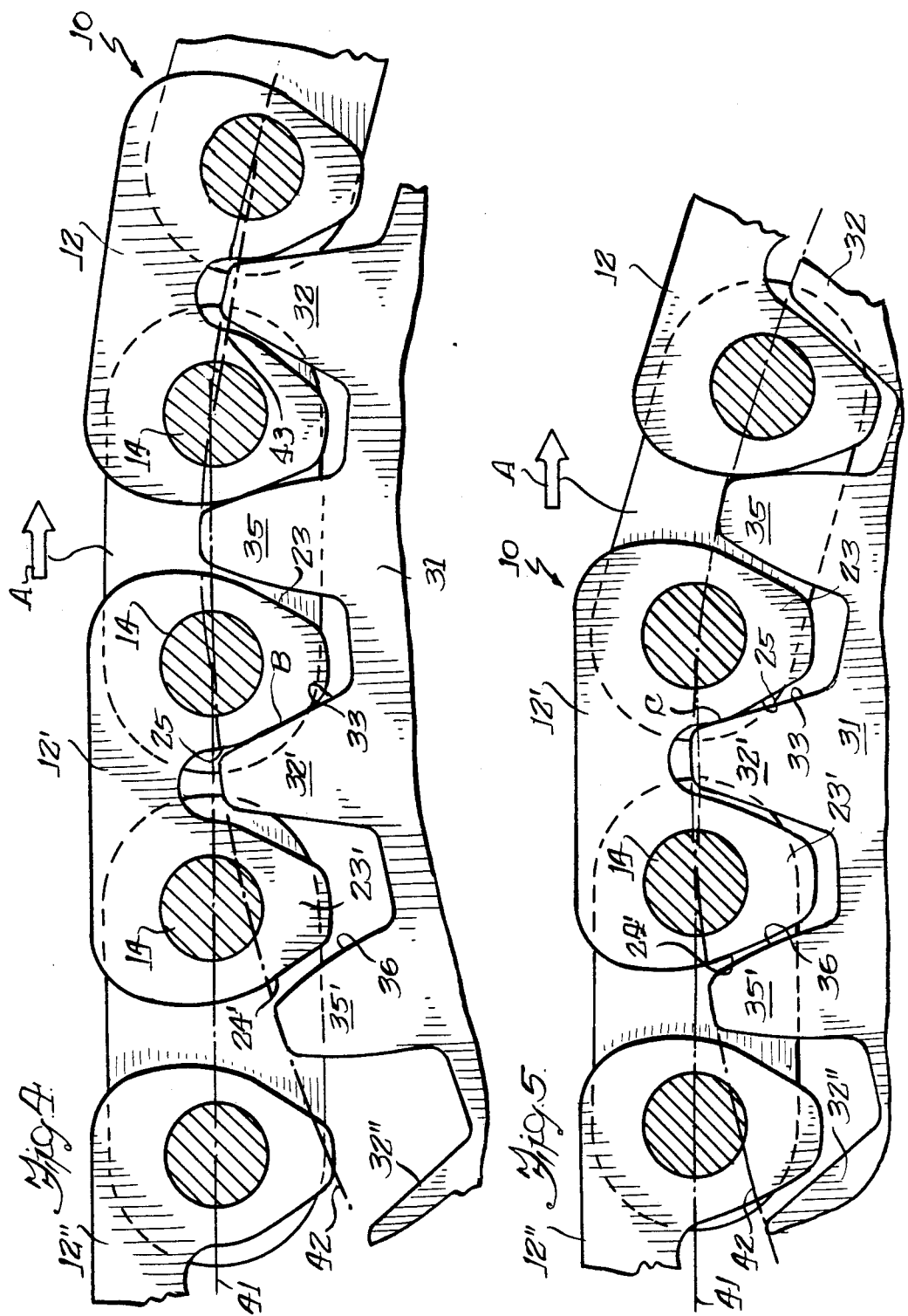

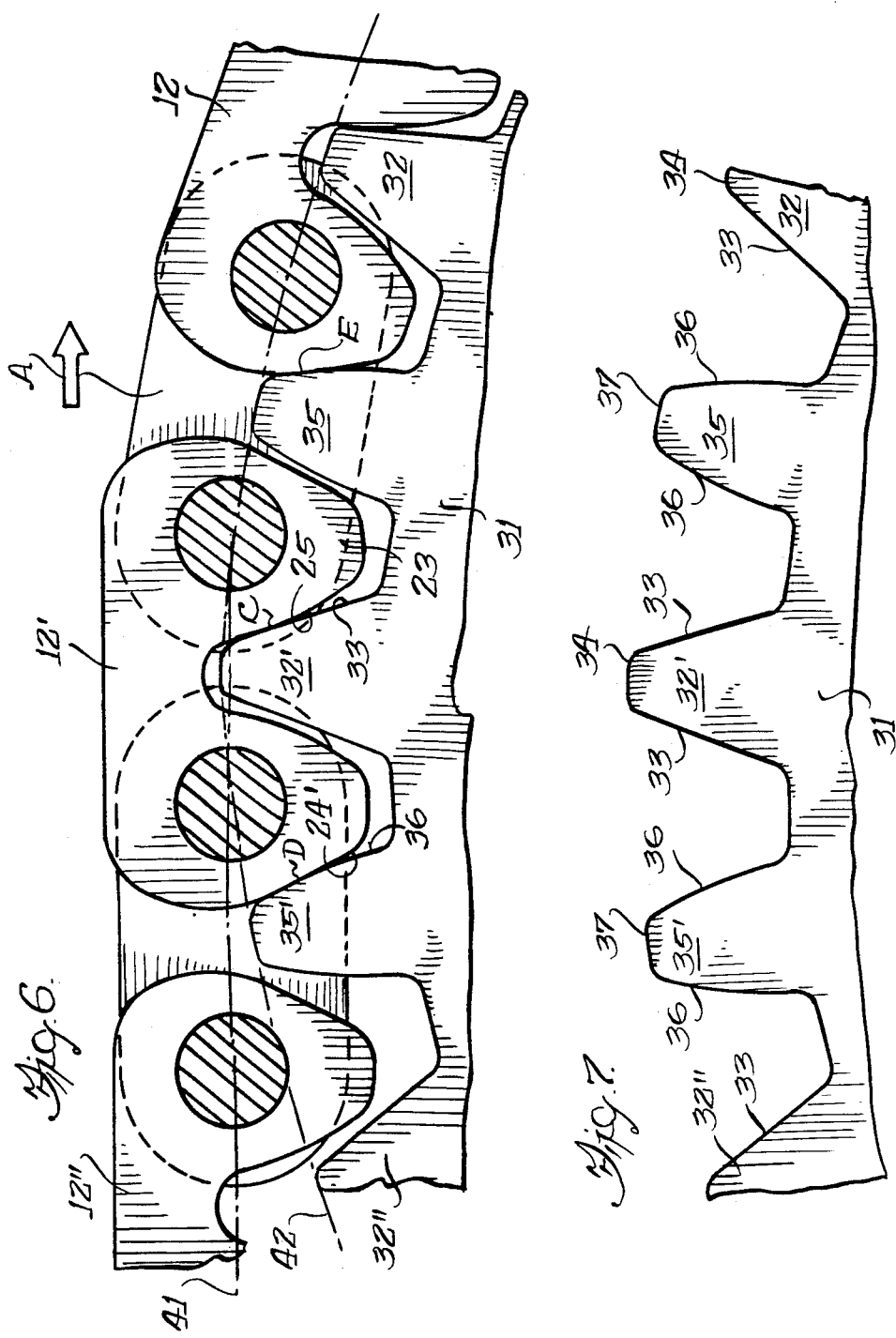

SILENT TIMING CHAIN AND SPROCKET SYSTEM

BACKGROUND OF THE INVENTION

The present invention relates to an improved silent timing chain for automotive or industrial drive applications.

Conventional silent timing chains have been used for many years to transmit power and motion between shafts in automotive applications. The majority of these chains were formed of rows or ranks of toothed links interleaved with adjacent rows of links and having aligned apertures receiving a pivot pin to join the rows and provide articulation of the chain as it passes around the driving and driven sprockets. Guide links were utilized on the outside edges of alternate rows of links in the chain to position the chain laterally on the sprockets. Each row of links engaged the sprocket teeth on either their inner flank or their outer flank, and each joint was supported by the links in one row. Each tooth on the driving sprocket transferred load to the chain, which offered a smooth engagement with the sprocket and quiet operation.

Silent chains were also produced using block constructions in the early 1900's. However, their usefulness was limited due to their low strength and they were replaced by the silent chains previously described. The engagement characteristics of these early block chains are unknown, but it is likely that such chains were constructed by omitting the inside links in the guide row without compensating for the lack of interleaved links present in conventional silent chains. Other types of timing drive chains involve the use of roller chains, especially in industrial applications.

SUMMARY OF THE INVENTION

The present invention relates to an improved silent timing chain and sprocket system designed to transmit torque and power between shafts as well as serve as a mechanical motion transfer mechanism. The chain is constructed in a block configuration comprising groups or rows of inside links designed to drivingly contact the sprockets alternating with the flanked by pairs of outside guide links or a center guide link in the adjacent rows. The interleaved inside links normally found in the rows having guide links have been omitted, resulting in a chain design constructed of fewer componets which is lighter in weight and lower in manufacturing cost.

The present invention also comprehends the provision of a novel silent timing drive chain sprocket wherein an even number of sprocket teeth are provided having two different flank profiles which alternate around the circumference of the sprocket. The link profiles and sprocket tooth profiles are specifically designed to be used in a chain having a block construction and compensate for the absence of interwoven links as used with a conventional silent chain. Thus, all of the teeth on the sprocket act to transfer load to the chain and each joint of the chain is supported in the correct radial position from the center of the sprocket. This results in quiet opertion similar to conventional silent chain formed of interleaved inside links.

Further objects are to provide a construction of maximum simplicity, efficiency, economy and ease of assembly and operation, and such further objects, advantages and capabilites as well later more fully appear and are inherently possessed thereby.

DESCRIPTION OF THE DRAWINGS

FIG. 1 is a side elevational view of the silent timing drive chain utilized in the present invention.

FIG. 2 is a top plan view of the chain of FIG. 1.

FIG. 3 is a side elevational view of a link of the chain.

FIGS. 4, 5 and 6 are side elevational views in sequence of the chain links engaging the sprocket teeth.

FIG. 7 is a partial side elevational view of the novel sprocket of the present invention showing the tooth profiles.

DESCRIPTION OF THE PREFERRED EMBODIMENT

Referring more particularly to the disclosure in the drawings wherein is shown an illustrative preferred embodiment of the present invention, FIGS. 1 and 2 disclose a silent timing drive chain 10 utilized to drive the cam shaft in an automotive vehicle engine, wherein the chain consists of blocks 11 of closely stacked inside links 12 (FIG. 3) alternating with pairs of flanking guide links 13 joined by round pivot pins 14 or other suitable pivot means. Each guide link 13, as seen in FIG. 1, does not have a toothed configuration as it functions to prevent lateral motion of the chain relative to the sprocket (see FIGS. 4, 5 and 6), but is provided with spaced apertures 15 receiving the pivot pins 14; which pins either have a press fit within the apertures 15 or project through the apertures to be headed at 16 at each end retaining the links together.

Each inside link 12, as seen in FIG. 3, consists of an inverted toothed link including a link body 21 having a pair of spaced apertures 22 and 22' to receive the pivot pins 14 and a pair of teeth 23 and 23' depending from the link body; each tooth having a generally straight outside flank 24 or 24', and a curved inside flank 25 or 25' meeting at a rounded tip or toe 26 or 26'. The curved inside flanks 25,25' of teeth 23,23' are struck from radii $r$ with their centers located outside of the confines of the link such as center R for flank 25. The inside flanks 25,25' meet in a rounded crotch 27 positioned above a line through the centers of the appertures 22 and 22'. Although shown as generally straight, the outside flanks could have slightly curved edges from a radius having the same center of curvature R.

As seen in FIG. 7, a driving sprocket 31 has a plurality of alternating tooth profiles, 32,35,32',35',32", etc., equally spaced about the circumference of the sprocket. The profile of teeth 32,32', etc. comprises outwardly converging straight-sided flanks 33 terminating in slightly rounded ends 34. With respect to teeth 35,35', etc., the tooth profile comprises involute curved flanks 36 terminating in slightly rounded ends 37. These alternating teeth will engage with the flanks of the leading and trailing chain link teeth.

Now considering FIGS. 4 through 6, the driving sprocket 31 is shown in progressive engagement with a block-type chain 10. In FIG. 4, the chain 10 moves to the right in the direction of arrow A into engagement with the sprocket 31 on the horizontal line 41 or chain pitch line. There will be two pins 14, flanking a sprocket tooth 33 at "top dead center"; at which point the pitch line 41 of the chain will be tangent to the chordal pitch diameter of the sprocket; i.e. the circle smaller than circle 42 that is tangent to the chords 43 formed when the chain wraps the sprocket. As the sprocket rotates clockwise, the pin 14 of the right hand side of the sprocket tooth 33 will follow the arc 42 of the sprocket pitch diameter; i.e. the circle passing through the center of the chain pins 14 as the chain is wrapped on the sprocket 31. Thus, the pin 14 will rise vertically reaching a maximum value when this pin is "top dead center" and is flanked by two teeth. As the sprocket continues to rotate clockwise, this pin will follow the arc 42 of the sprocket pitch diameter until another tooth is at "top dead center". The pin will now be at the left hand position of the sprocket tooth and the horizontal pitch line 41 passing through the centers of the pins in the free strand will again be tangent to the chordal pitch diameter.

Considering the engagement of the links 12 with the sprocket 31, a link 12 is in substantially full engagement with alternating profile sprocket teeth 32 and 35 as the sprocket rotates in the direction of arrow A. The next successive tooth 32' has its flank or edge 33 initially engaging the inside flank 35 of link tooth 23 for chain link 12' while the other tooth 23' is spaced from the sprocket tooth 35'. The link engagement with sprocket tooth 32' is at the lower portion B of the inside flank 25.

As rotation of the sprocket continues (see FIG. 5), the flank 33 of sprocket tooth 32' has moved up on inside flank 25 from contact area B to upper contact area C, and the curved flank 36 of the next successive tooth 35' is in closely adjacent to the outside flank 24 of trailing link tooth 23' for link 12'.

Upon furhter rotation of the sprocket 31 in the direction of arrow A, the flank 33 of tooth 32' remains in contact with area C on the inside flank 25 of tooth 23, where the sprocket tooth and link tooth are in full engagement (FIG. 6). Also, the flank 36 of sprocket tooth 35' is in engagement with the outside flank 24' of trailing tooth 23' to contact area D and will roll up the flank 24' to contact area E as seen for link 12. Also, the leading tooth of the next link 12" is approaching engagement of the next succeeding sprocket tooth 32". As the chain is wrapped around the sprocket, the teeth remain in full engagement until the links begin to leave the sprocket and travel towards the driven sprocket (not shown). The driven sprocket is driven by the chain as it leaves the sprocket and enters the tight strand leading to the driving sprocket in the direction of arrow A. On the other side of the driven sprocket, the sprocket acts as a driver in relation to the slack strand of the chain.

Also as seen in FIGS. 4, 5 and 6, the chain pitch line 41 extending through the centers of the pivot pins 14 and link apertures 22,22' intersects with the sprocket circular pitch diameter 42 either slightly before or when the links initiate engagement with the sprocket teeth, and contact is maintained on the sprocket as long as the chain is under tension. Each sprocket tooth carries load for strength of the sprocket. Smooth engagement will result between the chain and sprocket despite the absence of inside links in the guide rows of the chain. As the chain wraps the sprocket, each joint is supported in the correct radial position from the center of the sprocket. The construction of the chain is more economical and results in a quiet operation of the chain.

It can be seen that a similar effect can be produced by reversing the curved sided and flat sides of the chain links and indexing the chain one tooth on the sprocket such that the straight inside flank of the link engages an involute sprocket tooth and the curved outside flank engages a straight sprocket tooth. Other similar combinations can readily be envisioned.

I claim:

1. A driving sprocket for use with a silent timing chain having interleaved rows of links articulated together by pivot means, the sprocket comprising a body having an even number of substantially radially equal sprocket teeth, half of said sprocket teeth having straight-sided flanks alternating with teeth having involute curved flanks.

2. A driving sprocket for use with a block-type silent timing chain having blocks of closely stacked links alternating with pairs of flanking guide links articulated together by pivot means, the sprocket comprising a body having an even number of sprocket teeth with substantially equal radii, half of said sprocket teeth having straight-sided flanks alternating with teeth having involute curved flanks.

3. A driving sprocket as set forth in claim 2, in which one set of teeth engage the inside flanks of certain chain link teeth and the other set of teeth engage the outside flanks of the other chain link teeth.

4. A driving sprocket as set forth in claim 2, wherein said block-type chain engaging the sprocket includes blocks of links having leading and trailing teeth, said blocks being spaced by pairs of flanking guide links, said sprocket teeth having straight-sided flanks engaging the inside flanks of the leading chain link teeth.

5. A driving sprocket as set forth in claim 4, wherein said sprocket teeth having the involute curved flanks engaging the outside flanks of the trailing chain link teeth.

6. In combination, a driving sprocket having an even number of equally spaced sprocket teeth with substantially equal radii, one set of teeth having straight-sided flanks alternating with a second set of teeth having involute curved flanks, and a silent timing drive chain comprising rows of identical closely stacked inverted tooth links alternating with pairs of flanking guide links, said chain links and guide links having spaced apertures with the apertures of the guide links and adjacent rows of chain links being aligned to receive pivot means for articulation of the chain, said rows of chain links forming blocks having leading and trailing link teeth, each tooth having an outside flank and an inside flank merging into depending toes, said straight-sided sprocket teeth engaging the inside flanks of the leading link teeth and said involute curved flanks engaging the outside flanks of the trailing link teeth.

7. A driving sprocket and block-type chain combination as set forth in claim 6, wherein initial engagement of the sprocket teeth and chain link teeth is at a lower portion of the link teeth flanks, said engagement gradually sliding up said link flanks to reach full engagement therebetween.

8. In combination, a driving sprocket having an even number of equally spaced sprocket teeth with substantially equal radii, one set of teeth having straight-sided flanks alternating with a second set of teeth having involute curved flanks, and a silent timing drive chain comprising rows of interleaved inverted tooth links having spaced apertures with adjacent rows of interleaved links having their apertures aligned to receive articulation means, pairs of flanking guide links aligned with alternate rows of inverted tooth links, said straight-sided sprocket teeth engaging the inside flanks of one row of link teeth and said involute curved flanks engaging the outside flanks of the next adjacent row of link teeth.

9. The combination of claim 8, wherein initial engagement of each sprocket tooth with a block link tooth is at a lower portion of the tooth flank, said engagement gradually sliding up along the link flank until full engagement is reached.

* * * * *